United States Patent [19]
Nagata

[11] Patent Number: 4,560,044
[45] Date of Patent: Dec. 24, 1985

[54] HYDRAULIC PRESSURE MODULATION DEVICE

[75] Inventor: Hiroshi Nagata, Moriguchi, Japan

[73] Assignee: Kabushiki Kaisha Daikin Seisakusho, Neyagawa, Japan

[21] Appl. No.: 393,504

[22] Filed: Jun. 29, 1982

[51] Int. Cl.[4] ............... B60K 41/26; F16D 25/11
[52] U.S. Cl. .................... 192/3.57; 91/29; 137/110; 192/4 A; 192/52; 192/109 F
[58] Field of Search ........... 91/28, 29, 33; 192/4 A, 192/4 R, 109 F, 52, 85 R; 137/110

[56] References Cited

U.S. PATENT DOCUMENTS

| | | | |
|---|---|---|---|
| 3,089,572 | 5/1963 | Merfurth | 192/4 R |
| 3,444,762 | 5/1969 | Golan et al. | 192/4 A |
| 3,444,968 | 5/1969 | Golan et al. | 192/4 A |
| 3,820,417 | 6/1974 | Allen et al. | 192/109 F |
| 4,046,162 | 9/1977 | Rodeghiero | 192/109 F |
| 4,135,610 | 1/1979 | Charrerjea | 192/4 A |
| 4,465,168 | 8/1984 | Sato | 192/3.57 |

FOREIGN PATENT DOCUMENTS 47-38689 11/1972 Japan.

*Primary Examiner*—Rodney H. Bonck
*Attorney, Agent, or Firm*—Armstrong, Nikaido, Marmelstein & Kubovcik

[57] ABSTRACT

A hydraulic pressure modulation device disposed between a hydraulic pressure source and a selector valve comprising a cylinder; a spool fitted into the cylinder; an accumulator; an actuation chamber formed in the cylinder; a passage openly connecting the chamber to the selector valve; a spring forcing the spool against a pressure in the chamber; a first passage openly connecting the pressure source to the selector valve; a second passage operable to introduce the oil from the pressure source into the accumulator while the outlet pressure of the device increases from a first value to a second value; and a third passage operable to connect the accumulator to an oil tank substantially after the second passage is closed, the passages being formed in the cylinder and the spool.

18 Claims, 3 Drawing Figures

HYDRAULIC PRESSURE MODULATION DEVICE

BACKGROUND OF THE INVENTION

The present invention relates to a hydraulic pressure modulation device for a power shift clutch mechanism employed in industrial machines such as a forklift, a shovel loader, or the like.

Generally, a power shift clutch mechanism has several hydraulic clutches such as a forward driving clutch, a reverse driving clutch, a first (low speed) clutch and a second clutch. These clutches are connected to a hydraulic pressure source through a selector valve connected to a shift lever, and are operable to be engaged and released by operating the shift lever. However, a known mechanism has such a disadvantage that smooth speed changing and starting may not be possible, because a hydraulic pressure introduced to the clutch increases very rapidly at substantially the same time as shifting occurs, which causes sudden engaging of the clutch.

In order to avoid the sudden increasing of the pressure, some of the known mechanisms have employed oil pressure modulation devices disposed in hydraulic lines. A known modulation device comprises, for example, combined large and small pistons, or an accumulator and a choke combined together.

However, such known modulation devices can not perform the intended modulation operation when the shifting operation is rapidly repeated.

Accordingly, it is an object of the invention to provide an improved hydraulic pressure modulation device overcoming the above-noted disadvantages.

Other and further objects, features and advantages of the invention will appear more fully from the following description of the preferred embodiments of the invention.

DETAILED DESCRIPTION OF THE PREFERRED EMBODIMENTS

Figure 1:
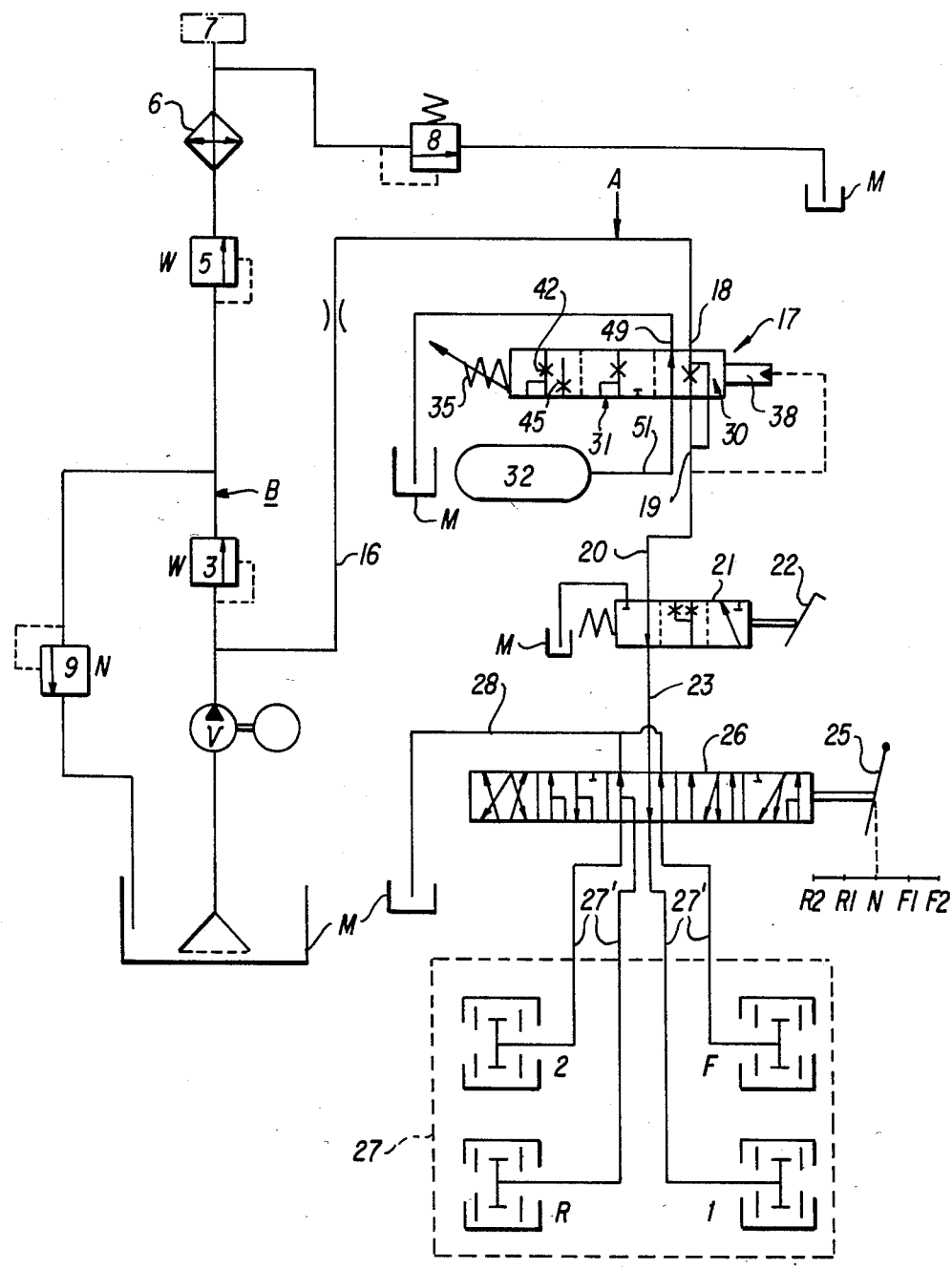
FIG. 1 is a schematic diagram of an oil circuit of an embodiment of the invention employed in a power shift clutch mechanism.

In FIG. 1, an oil hydraulic circuit A and a lubricating oil circuit B are illustrated, and the circuit B is detailed first. An oil pump V connected to an oil tank M is connected to portions 7 to be lubricated through a pressure regulating valve 3, an outlet pressure regulating valve 5 and a cooler 6. The circuit B is also provided with a lubricating valve 8 and an inlet pressure relief valve 9.

The hydraulic pressure circuit A is provided with an inlet passage 16 connected to a point between the pump V and the valve 3. The downstream end of the passage 16 is connected to an inlet 18 of a hydraulic pressure modulation device 17 detailed later. An outlet 19 of the device 17 is connected to an inching valve 21 through a passage 20. The valve 21 is of the variable restrictor type and is connected to a brake pedal 22, so that the degree of the restriction may change in accordance with operation of the pedal 22. When the pedal 22 is in an illustrated uppermost position, the valve 21 fully opens and connects the upstream passage 20 and a downstream passage 23 together. When the pedal 22 is lowered to a lowermost position, the passages 20 and 23 are closed to each other.

The passage 23 is connected to a selector valve 26 connected to a shift lever 25. The valve 26 is operable to alternately connect the passage 23 and a drain passage 28 to passages 27' connecting to forward and reverse clutches F and R respectively and is also operable to alternately connect the passages 23 and 28 to passages 27' connecting to a first (low speed range) clutch 1 and a second (high speed range) clutch 2 respectively. In an illustrated position in which the lever 25 is in a neutral position N, the passage 23 is connected to the first clutch 1, whereby, the circuit A is under a pressurized condition. When the valve 26 is shifted by the lever 25 from the neutral position to a position in which the passage 23 is connected to the clutch F or the clutch R, the pressure in the circuit A temporarily decreases, and then gradually increases. In this operation, when the shift lever 25 is shifted to the forward first position F1, the passage 23 is connected to the forward clutch F and the first clutch 1, whereby the hydraulic pressure is introduced to the clutches F and 1 to engage them, thus the neutral condition of the clutch mechanism 27 changes to a forward first condition. Other speed ranges are obtained by a similar operation. Although, in the illustrated position, the first clutch 1 is engaged by an introduced pressure, the forward and reverse clutches F and R are connected to the drain passage 28. Therefore, the clutch mechanism 27 is in a neutral position.

Figure 2:
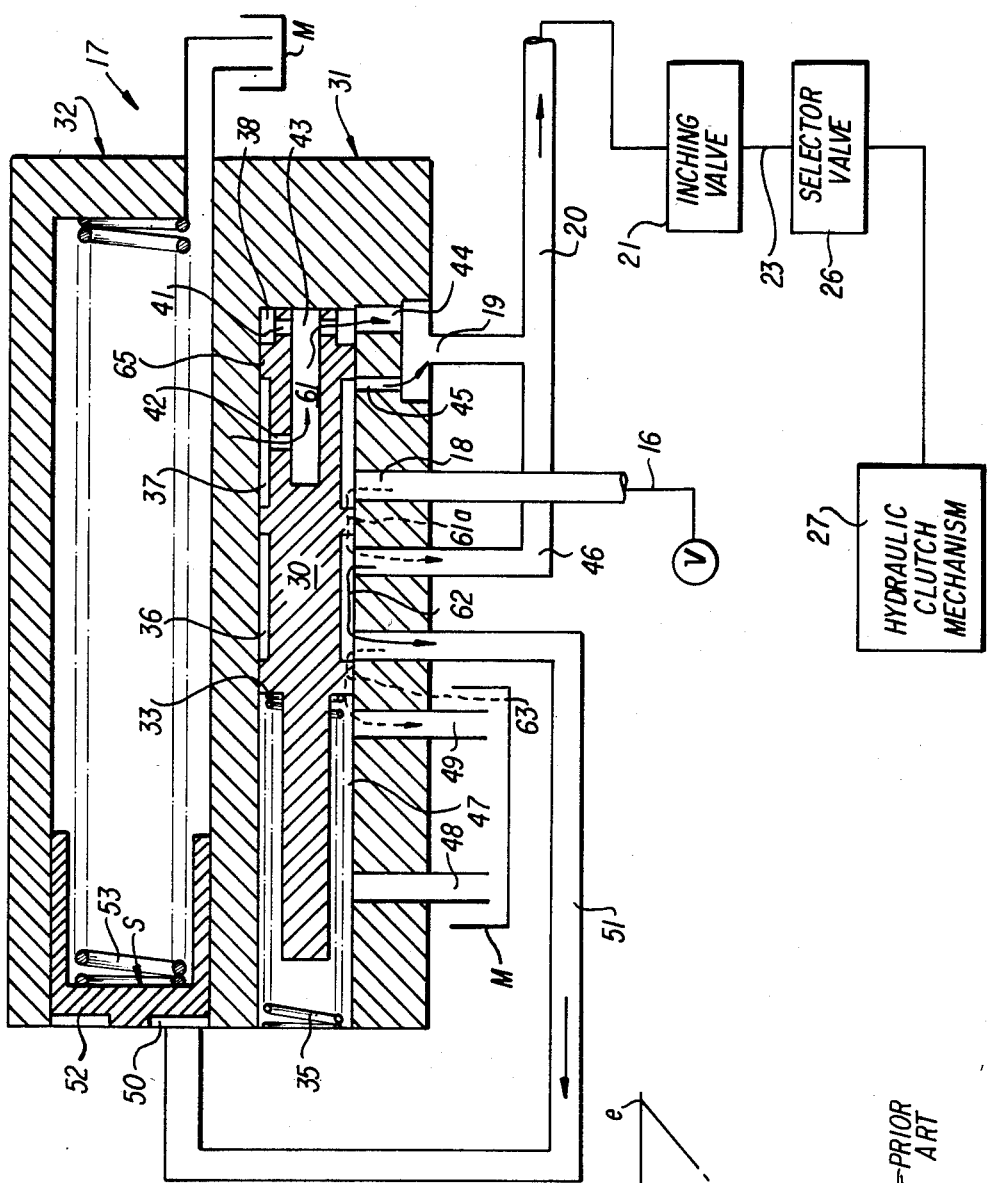
FIG. 2 is a sectional view of a hydraulic pressure modulation device according to the invention.

The hydraulic pressure modulation device 17 is provided, as shown in FIG. 2, with a spool 30 fitted into a cylinder 31 and an accumulator 32. A compressible coil spring 35 is arranged in the cylinder 31. The left end in FIG. 2 of the spring 35 abuts an end wall of the cylinder 31. The right end of the spring 31 abuts an annular surface of a stepped portion 33 of the spool 30. The spool 30 is provided at its outer periphery with two annular grooves 36 and 37. The spool 30 is also provided at its right end with a small diameter portion 41 around which an annular actuation chamber 38 is formed. The groove 37 is connected to the chamber 38 through a passage 43 and an orifice restrictor 42.

In the illustrated position in FIG. 2, hydraulic pressure in the chamber 38 is reduced, and the spool 30 is shifted by the elasticity of the spring 35 to its right end position. The cylinder 31 is provided with a bypass passage 45 which connects the outlet 19 to the groove 37 in the illustrated position. The cylinder 31 is also provided with passages 46, 48, 49 and 51. The passage 46 connects the outlet 19 to the groove 36 in the illustrated position. The passages 48 and 49 connect the tank M to a chamber 47 formed at the left of the portion 33 in the illustrated position. The passage 51 connects the groove 36 in the illustrated position to an oil accumulation chamber 50 in the accumulator 32.

A piston 52 and a compressible coil spring 53 are disposed in the accumulator 32. When the hydraulic pressure in the chamber 50 is reduced, the piston 52 is shifted to its left end position by an initial elastic force S of the spring 53 as illustrated in FIG. 2. The initial force S is determined so as to balance with a predetermined value P2 (see FIG. 3) of the hydraulic pressure in the chamber 50. When the pressure in the chamber 50 exceeds the value P2, the piston 52 moves rightward against the spring 53, and the oil starts to be introduced into the chamber 50.

Operation of the device is detailed hereinafter. When the valve 26 is shifted from its neutral position, the pressure in the circuit A temporarily decreases, and the pressure in the actuation chamber 38 also descends. This condition corresponds to a point O in FIG. 3. The spool 30, which has been in its left end position before the above shifting, as detailed later, is shifted rightward by the spring 35 as illustrated in FIG. 2.

After the valve 26 is shifted, the oil is introduced to the clutch mechanism 27, and a clutch piston (not shown) of e.g., the forward clutch F, starts to move toward a friction plate. Initially (until a time T2 in FIG. 3), the clutch piston does not contact the friction plate, thus, the outlet pressure P of the device 17 which is introduced to the clutch increases very slowly as shown in section a-b of a line X in FIG. 3. During this operation, the spool 30 is forced by the pressure (O-P2) in the chamber 38, but occupies the illustrated position or a slightly leftward position, so that the inlet 18 is connected to the outlet 19 through a first passage 61 comprising the groove 37, the restrictor 42, the passage 43, the chamber 38 and the passage 44, and inlet 18 is also connected to the outlet 19 through the groove 37 and the bypass passage 45. As detailed above, the inlet 18 is connected to the outlet through two passages 45 and 61 in this operation, whereby, plenty of the oil is supplied into the clutch mechanism 27 in a short time, which reduces a time T1-T2 in which the clutch piston moves without pressing the friction plate, and reduces the delay before the clutch starts to engage.

Figure 3:
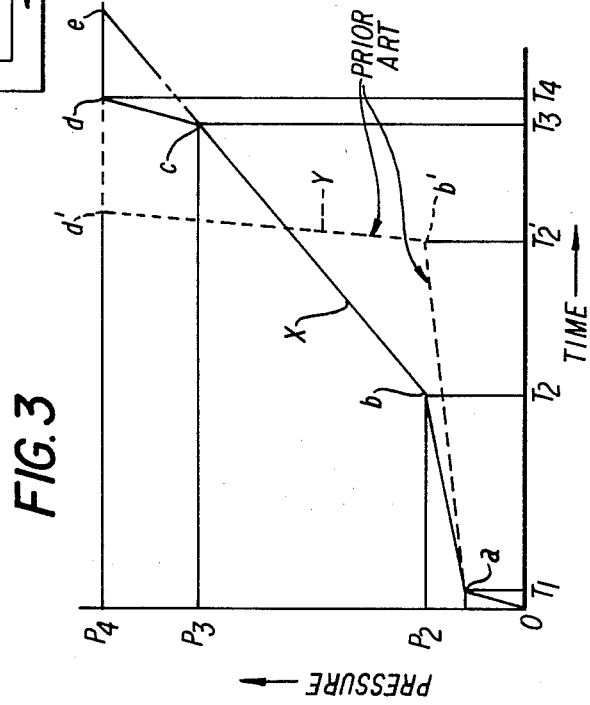
FIG. 3 is a graph explaining modulation characteristics of a modulation device according to the invention.

A dotted line Y in FIG. 3 indicates a characteristic of a known device. According to the known device, a long time (T1-T'2) is required for a clutch piston to move until it contacts with a friction plate, because the known device is designed to introduce oil to the clutch always through only one restrictor. For the reference device, section O-a indicates a condition before the clutch piston starts to move against a frictional resistance between the piston and the cylinder.

When the clutch piston contacts with the friction plate, the pressure starts to rather rapidly increase as shown in section b-c. After the pressure in the chamber 38 exceeds the value P2, the spool 30 is shifted leftward by the pressure, so that a large diameter portion 65 (land) closes the bypass passage 45, and the inlet 18 is connected to the outlet 19 only through the first passage 61 including the restrictor 42. Thus, the quantity of oil discharged from the outlet 19 is reduced. At the same time, some of the oil discharged from the outlet 19 flows into the accumulator 32 through a second passage 62 comprising the passage 46, the groove 36 and the passage 51. As detailed above, the quantity of discharged oil is reduced and some of the discharged oil is introduced to the accumulator 32. Therefore, the pressure in the chamber 38 and the clutch mechanism 27 rather slowly increases as shown in the section b-c, and thus, the clutch mechanism 27 smoothly engages.

In the above operation, the accumulation chamber 50 has been connected to the outlet 19 since the spool 30 was shifted to the right end of cylinder 31 (at point O in FIG. 3). However, while the pressure is lower than the value P2 (O-b), the piston 52 does not move, and the oil does not flow into the chamber 50 because the initial force S applied to the piston 52 by the spring 53 is determined so as to balance with the pressure of P2 as detailed before.

For reference, the known modulation device suddenly increases the pressure as shown in section b'-d' in FIG. 3 causing sudden engagement of the clutch, when shifting operation is rapidly repeated.

When the pressure in the chamber 38 increases to a value P3, the spool 30 further moves leftward to a position in which the groove 36 does not connect the passage 51 to the passage 46. At the same time as, or after, this movement, the passage 51 is connected to the tank M through the groove 36 and the passage 49, so that the piston 52 located to the right is returned to the illustrated position by the spring 53, whereby the oil in the chamber 50 is discharged to the tank M through a third passage 63 comprising the passage 51, the groove 36 and the passage 49. The inlet 18 is connected to the passage 46 through the groove 37, so that most of the oil does not flow into the first passage 61 including the restrictor 42 but is supplied to the clutch mechanism 27 through first passage 61a an auxiliary comprising the groove 37 and the passage 46. In this operation, the oil is not accumulated into the accumulator 32, and the inlet 18 is connected to the outlet 19 without communicating through the restrictor 42 as detailed above. Therefore, the pressure P increases very rapidly to a maximum value P4 (c-d), so that the clutch mechanism 27 which has been nearly fully engaged is engaged rapidly and perfectly fully, and harmful slip in the clutch is prevented. This condition in which the spool 30 is located at its left end position in cylinder 31, continues until next shifting of the valve 26 starts.

When the valve 26 is shifted after the above operation, the pressure decreases, the spool 30 moves rightward, and the same operation as described above is repeated.

According to the invention, as stated hereinabove, the modulation device 17 is designed to introduce some of the oil to the accumulator 32 when the clutch piston contacts with the friction plate, so that the oil pressure increases rather slowly while the clutch piston contacts with the friction plate. Thus, the clutch mechanism 27 is engaged smoothly. Further, since the spool 30 is forced by the spring 35, the spool 30 is shifted rightward in FIG. 2 at the same time as the pressure decreases. Therefore, each member reliably operates even when the shifting operation of the valve 26 is rapidly repeated. Since the device 17 basically consists of the accumulator 32 and the cylinder 31 in which the spool 30 is fitted, it has simple construction, and the manufacturing cost is low.

In modifications of the invention, the first passage 61 and the actuation chamber 38 may be formed independently of each other. The time T3 at which the groove 36 connects the passages 49 and 51 together to release the pressure in the chamber 50 may coincide with the time T4 at which the pressure P reaches the maximum value P4. In this modification, rather slowly increasing application of the pressure lasts to the end of the modulation cycle as shown in section c-e in FIG. 3.

The restrictor 42 may be changed to a mere passage. In this modification, the capacity of the chamber 50 and a strengh of the spring 53 may be varied to attain intended modulation characteristics.

The bypass passage 45 may be eliminated. In this case, a restrictor 42 of a larger diameter may be employed to reduce the time T1-T2 before the clutch piston contacts with the friction plate.

The first passage 61 may be designed to close when the other first passage 61a opens and the clutch is nearly fully engaged.

A screw or other means may be associated with the spring 35 to adjust the elastic force of the spring 35 (see FIG. 1).

Although the invention has been described in its preferred form with a certain degree of particularity, it is understood that the present disclosure of the preferred form may be changed in the details of construction and the combination, and varied arrangement of the parts may be resorted to without departing from the spirit and scope of the invention as hereinafter claimed.

What is claimed:

1. A hydraulic pressure modulation device adapted to be disposed between a hydraulic pressure source and a selector valve, for modulating hydraulic pressure supplied to the selector valve comprising: a cylinder; a spool fitted into the cylinder; an accumulator; an actuation chamber formed in the cylinder; a first passage openly connecting the chamber to the selector valve; a spring forcing the spool against a hydraulic pressure developed in the chamber; an auxiliary first passage openly connecting the pressure source to the selector valve; a second passage coupling the pressure source to the accumulator, for operably introducing oil from the pressure source into the accumulator while the outlet pressure of the device increases from a first value to a second value; and a third passage coupling the accumulator to an oil tank, for operably connecting the accumulator to the oil tank substantially after the second passage is closed, said passages being formed in the cylinder and the spool.

2. A hydraulic pressure modulation device according to claim 1, wherein said accumulator is provided with an accumulation chamber, a piston facing the accumulation chamber and a piston spring forcing the piston against a hydraulic pressure developed in the accumulation chamber with an initial elastic force applied to the piston by the piston spring being determined so as to balance with a hydraulic pressure developed in the accumulation chamber corresponding to the first value of the outlet pressure of the device such that the accumulation chamber is urged to exhibit a minimum value, and whereby operable connection of the pressure source to the accumulator is initiated via the second passage before the outlet pressure increases to the first value.

3. A modulation device of claim 1 or 2 wherein the cylinder and the spool are provided with bypass passage means operable to connect the pressure source to the selector valve until the outlet pressure exceeds the first value.

4. A modulation device of claims 1 or 2 wherein the selector valve is connected to a hydraulic clutch mechanism, and the first valve corresponds to a value of a hydraulic pressure at which a clutch piston of the hydraulic clutch mechanism starts to press a friction plate of the hydraulic clutch mechanism in a clutch-engaging operation.

5. A modulation device according to claim 3 wherein the selector valve is connected to a hydraulic clutch mechanism, and the first value corresponds to a value of a hydraulic pressure at which a clutch piston of the hydraulic clutch mechanism starts to press a friction plate of the hydraulic clutch mechanism in a clutch-engaging operation.

6. A modulation device of claim 3 wherein the first passage is provided with a restrictor.

7. A modulation device according to claim 4 wherein the selector valve is connected to a hydraulic clutch mechanism, and the first value corresponds to a value of a hydraulic pressure at which a clutch piston starts to press a friction plate of the hydraulic clutch mechanism in a clutch-engaging operation.

8. A hydraulic pressure modulation device adapted to be disposed between a hydraulic pressure source and a selector valve, for modulating hydraulic pressure supplied to the selector valve, comprising: a cylinder; a spool fitted into the cylinder; an accumulator; an actuation chamber formed in the cylinder; a passage openly connecting the chamber to the selector valve; a spring forcing the spool against a hydraulic pressure developed in the chamber; a first passage openly connecting the pressure source to the selector valve; a second passage coupling the pressure source to the accumulator, for operably introducing oil from the pressure source into the accumulator while the outlet pressure of the device increases from a first value to a second value; and a third passage coupling the the accumulator to an oil tank, for operably connecting the accumulator to the oil tank substantially after the second passage is closed, the first, second and third passages being formed by ports and grooves provided in the cylinder and the spool.

9. A modulation device according to claim 8 wherein the accumulator is provided with an accumulation chamber, a piston facing the accumulation chamber and a piston spring forcing the piston against a hydraulic pressure developed in the accumulation chamber with an initial elastic force applied to the piston by the piston spring being determined so as to balance with a hydraulic pressure developed in the accumulation chamber corresponding to the first valve of the outlet pressure such that the accumulation chamber is urged to exhibit a minimum volume, and whereby operable connection of the pressure source to the accumulator is initiated via the second passage before the outlet pressure increases to the first value.

10. A modulation device according to claim 8 or 9 wherein the cylinder and the spool are provided with bypass passage means operable to connect the pressure source to the selector valve until the outlet pressure exceeds the first value.

11. A modulation device according to claim 10 wherein the selector valve is connected to a hydraulic clutch mechanism and the first value corresponds to a value of a hydraulic pressure at which a clutch piston of the hydraulic clutch mechanism starts to press a friction plate of the hydraulic clutch mechanism in a clutch-engaging operation.

12. A modulation device according to claim 10 wherein the first passage is provided with a restrictor.

13. A modulation device according to claim 12 wherein the selector valve is connected to a hydraulic clutch mechanism and the first value corresponds to a value of a hydraulic pressure at which a clutch piston of the hydraulic clutch mechanism starts to press a friction plate of the hydraulic clutch mechanism in a clutch-engaging operation.

14. A modulation device according to claim 8 or 9 wherein the selector valve is connected to a hydraulic clutch mechanism, and the first value corresponds to a value of a hydraulic pressure at which a clutch piston of the hydraulic clutch mechanism starts to press a friction plate of the hydraulic clutch mechanism in a clutch-engaging operation.

15. A modulation device according to claim 14 further comprising an auxiliary first passage coupling the pressure source with the selector valve and operable to connect the pressure source to the selector valve when the clutch mechanism is nearly fully engaged so as to rapidly engage the clutch mechanism fully.

16. A modulation device according to claim 14 wherein the spool is provided with a groove forming a bypass passage coupling the pressure source to the selector valve and operable to connect the pressure source to the selector valve when the clutch mechanism is nearly fully engaged so as to rapidly engage the clutch mechanism fully.

17. A modulation device according to claim 8 provided with a bypass passage comprising a groove and a port formed in the spool and the cylinder.

18. A modulation device according to claim 8 wherein the second and third passages are formed by a common groove provided in the spool.

* * * * *